May 7, 1957     C. J. HOMBACH     2,791,450
OVAL RIM PIPE HUB

Filed Feb. 27, 1952     3 Sheets-Sheet 1

*INVENTOR.*
CARL J. HOMBACH
BY *Carl J. Hombach*
*G. W. Deller*
ATTORNEY

May 7, 1957  C. J. HOMBACH  2,791,450
OVAL RIM PIPE HUB

Filed Feb. 27, 1952  3 Sheets-Sheet 3

INVENTOR.
CARL J. HOMBACH
BY
ATTORNEY

United States Patent Office 2,791,450
Patented May 7, 1957

2,791,450

OVAL RIM PIPE HUB

Carl J. Hombach, North Caldwell, N. J.

Application February 27, 1952, Serial No. 273,664

13 Claims. (Cl. 285—156)

The present invention relates to hub and spigot pipe line connections of the type almost universally employed for plumbing and drainage installations. In such installations, the spigot end of one section is inserted in the diametrically enlarged cylindrical hub of the preceding section and the joint is completed by yarning with oakum and pouring with lead in the conventional manner. The hubs are concentric on the lineal axis of the pipe line and are ideal for connecting straight lines of piping. In building construction, however, waste pipe lines branch in various directions from the original or initial direction of house sewer or drain lines, and the consequent changes of direction require the use of special fittings formed as angle bends and classified according to the angle formed: as, for instance, ¼ of 90° bend; ⅛ or 45° bend; ⅟₁₆ or 22½° bend; ⅙ or 60° bend, etc. In some cases, some of these angles are taken from the side of a fitting or with a branch fitting in combination with one of the angle bends mentioned above. This calls for a large assortment of fittings. It frequently happens that angles are necessary for which no angle fittings are available; for example, a 38° or 52° angle from the direction of the main line of pipe. At times, a trench line may need a small angle bend to avoid some structural difficulty and no sharp angle fittings are desirable.

It has been conventional practice heretofore to meet these situations by the use of lopsided joints to overcome the angle deficiency of the angle fittings or the straight line of pipe. However, joints so made are structurally weak and create lodging places for sewage matter.

The present invention is designed to overcome these prior art difficulties and to provide for unobstructed flow of sewage in the pipe lines. It is also designed to facilitate the insertion of branch fittings into existing lines of cast iron soil pipe, galvanized iron pipe, ceramic pipe, and the like, wherein a section of pipe has a portion cut out and replaced by the insert fitting in the method disclosed in my copending application Serial No. 66,661 filed December 22, 1948, now abandoned.

It is, therefore, an object of the present invention to provide a novel hub for hub and spigot pipe connection, which hub is capable of taking a relatively wide range of angle fittings without modification of its structure.

Another object is to provide a pipe hub having a rounded end oblong rim whereof the major and minor axes intersect at a point concentric with the throat of the hub.

A further object is to provide a pipe hub having an oval rim and a circular throat with at least a portion of the hub wall flared therebetween in the direction of the major axis of the rim.

Still another object is to provide an oval rim pipe hub having a circular throat encompassed by an internal annular shoulder reversely curved to provide a seat for the spigot end of an adjacent pipe section.

Other and incidental objects will be apparent from the following description taken in conjunction with the accompanying drawings, in which.

Figure 1:
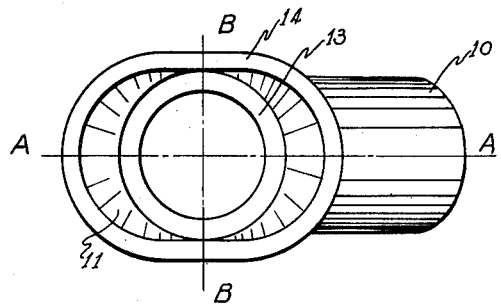
Figure 1 is a rim end view of an angle fitting comprising a pipe section formed with the oval rim hub of the present invention.
Figure 3:
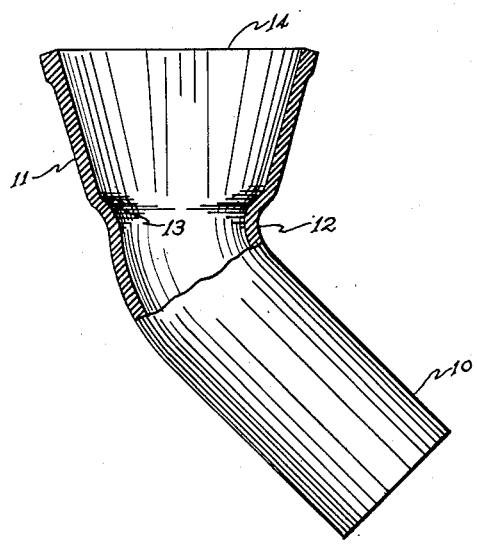
Figure 3 is a side elevation of the structure of Fig. 1, with the hub and throat portion in section.
Figure 5:
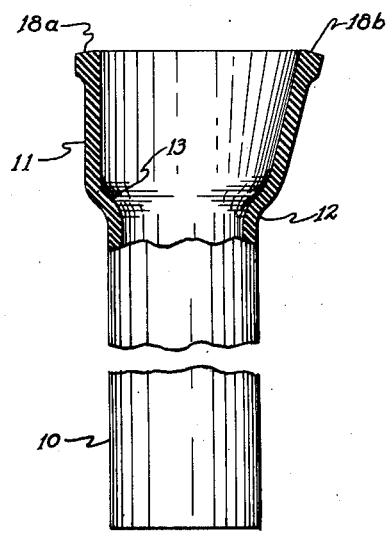
Figure 5 is an elevation, partly in section, of a full length soil pipe section cast with a semi-oval hub constituting one form of this invention.
Figure 6:
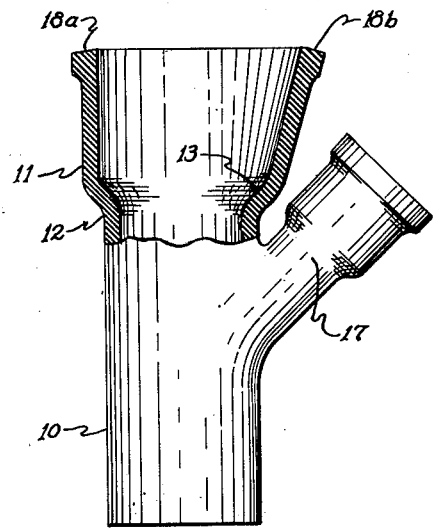
Figure 7:
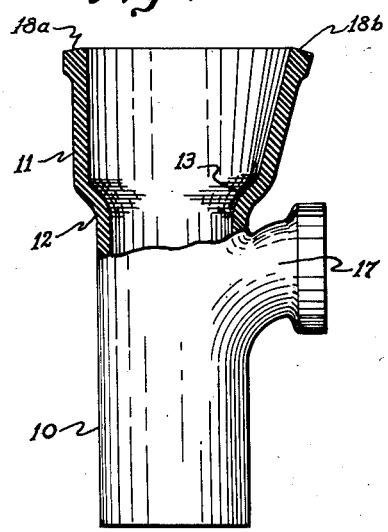
Figure 8:
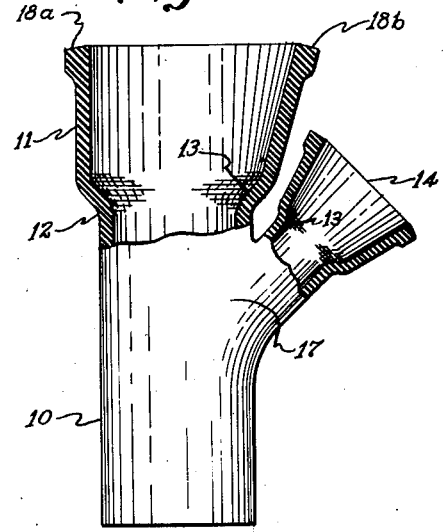
Figure 9:
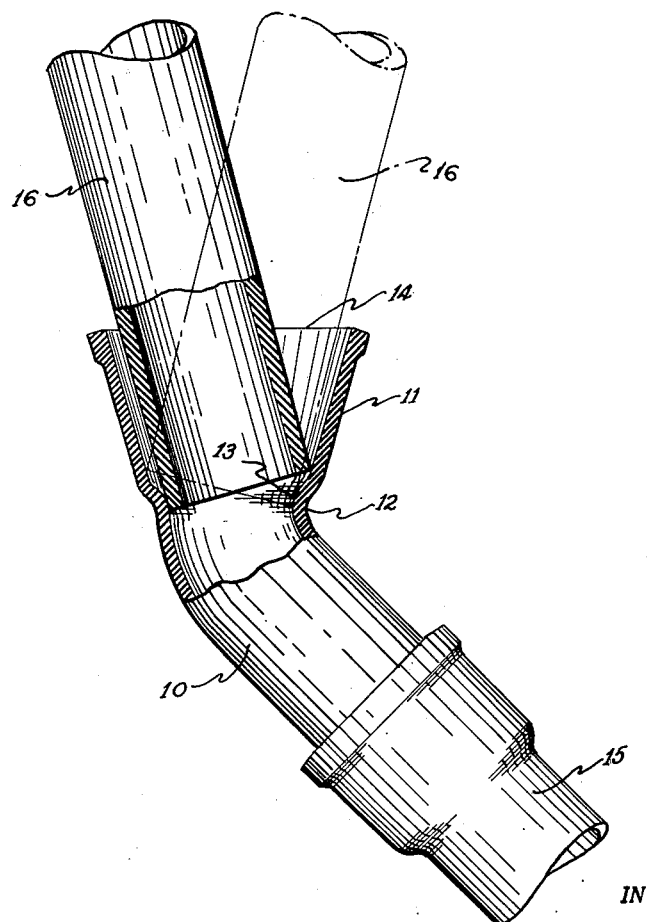

Figures 6, 7, and 8 are views similar to Fig. 5 but illustrating the invention as used with various types of branch fittings; and Figure 9 is an elevation, partly in section, illustrating a service application of the angle fitting shown in Figs. 1 and 3.

In all its forms the invention comprises a section of pipe of the type known in the trade as hub and spigot pipe, having a cylindrical spigot end portion 10 and an integral hub end portion 11. The hub is formed with an oblong rim, preferably either oval or semi-oval, and is enlarged with respect to the pipe bore. Its base provides a circular throat 12 having an internal annular shoulder 13 on the diameter of the pipe bore and which merges into the hub wall in a relatively long reverse curve. The shoulder 13 occupies a plane parallel to the plane of the hub rim.

In the angle fitting shown in Figs. 1, 3, and 9, the hub has an oval rim 14 disposed with its major axis A—A in the longitudinal median plane of the fitting and intersecting its minor axis B—B at right angles at a point concentric with the shoulder 13. The opposite sides of the hub wall at their intersection with the minor axis B—B are parallel from their junction with the shoulder 13 throughout their full extent to the rim, their distance apart being the same as the internal diameter of a conventional cylindrical hub for the same type of fitting. The remainder of the hub wall is, however, flared laterally outward in the direction of the major axis A—A equally on opposite sides of the minor axis from the junction with the shoulder 13 out to the rim. The advantages of this construction are apparent in Fig. 9, wherein the angle fitting is shown as installed between a conventional hub and spigot pipe section 15 and the spigot end of another pipe section 16. In this view the section 16 is shown in full line substantially at one limit of inclination with respect to the hub 11, and in chain line at substantially its opposite limit of inclination. A wide angle variation is obtainable with this type of fitting, and in all cases the end of the inserted spigot engages the shoulder 13 fully, so that there is no obstruction to flow or lodging place for sewage to collect.

Figure 2:
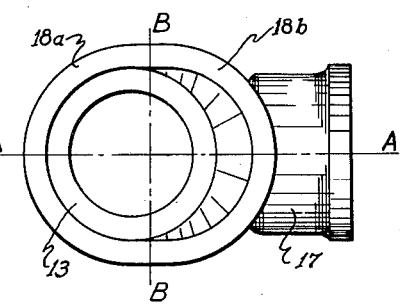
Figure 2 is a rim end view of a modified form of the invention as used in a tee fitting.
Figure 4:
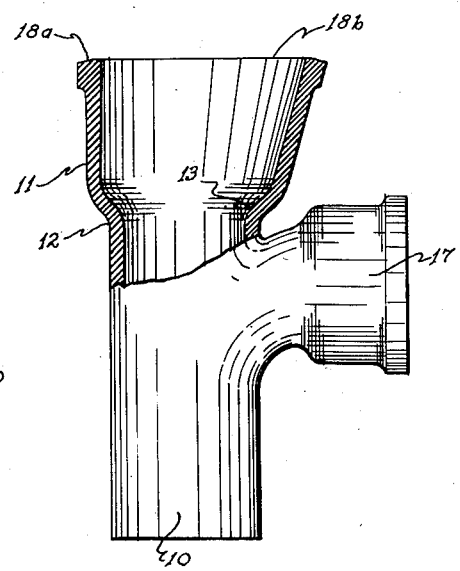
Figure 4 is a side elevation of the structure of Fig. 2, with the hub and throat portion in section.

In the type of branch fitting illustrated in Figs. 2 and 4 the body of the fitting has a lateral branch 17 intermediate the spigot 10 and hub 11. In this, as in all forms, the hub has an oval rim with its major and minor axes intersecting at right angles at a point concentric with the throat 12 and shoulder 13, and with its major axis in the direction of the branch and in the longitudinal median plane of the fitting. In this embodiment of the invention, however, the major axis of the rim is shorter than the major axis of the rim 14 shown in Fig. 1, and has a semi-circular portion 18a merged with a semi-oval portion 18b. The semi-oval portion 18b is disposed in the direction of the branch 17 with its major axis parallel to the axis of the branch; and both portions 18a and 18b occupy a common plane parallel to the plane of the shoulder 13. Also in this embodiment of the invention, the wall of the hub from the shoulder 13 out to the rim portion 18a is semi-cylindrical, while the remainder of the wall is flared outwardly from the shoulder to the rim portion 18b exactly as in the form of fitting shown in Figs. 1 and 3.

The various forms of fittings shown in Figs. 5, 6, 7, and 8 are substantially identical to the fitting shown in Figs. 2 and 4, and constitute various uses of my invention. In all of Figs. 2, 4, and 5–8 the hub structure is identical and the same reference characters designate the same parts throughout the several views. In Fig. 5 the hub is shown as cast on a full length of hub and spigot pipe. Fig. 6 shows the hub as used on a Y fitting. Fig. 7 illustrates the hub employed on a type of T fitting having a thread tapped branch. Fig. 8 shows a fitting in which the branch is provided with a full oval hub identical to the full oval hub in Figs. 1 and 3.

My improved hub on an angle fitting gives the fitting the range of three different angle fittings as used in the trade prior to the present invention. It is capable of use in odd angle connections without modification of a joint, which cannot be accomplished with prior art fittings of which I am aware. Used on full length straight pipe sections, as in trench work in particular, it permits long radius bends in pipe lines; no curved pipe is required. It permits fittings to be inserted in existing pipe lines easily and with far less labor than heretofore. All that is necessary with the present invention is to insert the spigot of a following section at the desired angle to seat on the shoulder 13 and to yarn the joint and pour with lead in the conventional manner.

Although I have shown and described herein certain preferred embodiments of the invention, it is to be understood that various other combinations and arrangements of hubs, angle, and branch fittings may be employed to any extent consistent with the scope of the invention as claimed.

I claim:

1. In hub and spigot pipe, a hub having a base providing a reduced circular throat, an internal annular shoulder of reverse curvature surrounding said throat and constituting a seat for the spigot end of an adjacent pipe section when applied, a substantially oval rim on the hub, and a portion of the hub wall being flared outwardly from said shoulder to the rim in the direction of the major axis of the rim.

2. In hub and spigot pipe, a hub having a base providing a reduced circular throat, an internal annular shoulder of reverse curvature surrounding said throat and constituting a seat for the spigot end of an adjacent pipe section when applied, a substantially oval rim on the hub with its major and minor axes intersecting at a point concentric with said throat, and those portions of the hub wall opposed in the direction of the major axis of the rim being outwardly and oppositely flared from said shoulder to the rim.

3. A pipe fitting having a spigot end portion and a hub end portion, the base of the hub providing a circular throat on the radius of the pipe bore, an internal annular shoulder of reverse curvature surrounding the throat at the base of the hub and constituting a seat for the spigot end of an adjacent pipe section when applied, the rim of the hub being substantially oval with its major and minor axes intersecting at a point concentric with said throat and with its major axis in the longitudinal median plane of the fitting, and a portion of the hub wall being flared outwardly from said shoulder to the rim in the direction of the major axis of the rim.

4. An angle pipe fitting having a hub at one end and a spigot end portion with its longitudinal axis at an angle relative to the hub axis, the base of said hub providing a circular throat on the radius of the spigot end portion, an internal annular shoulder of reverse curvature surrounding the throat and constituting a seat for the spigot end of an adjacent pipe section when applied, the rim of the hub being substantially oval with its major and minor axes intersecting at a point concentric with the throat and with its major axis lying in the longitudinal median plane of the fitting, and those portions of the hub wall opposed in the direction of the major axis of the rim being outwardly and oppositely flared from said shoulder to the rim.

5. In hub and spigot pipe, a hub having a base providing a reduced circular throat, an internal annular shoulder tapering upwardly and outwardly surrounding said throat, and constituting a substantially conical seat for the spigot end of an adjacent pipe section when applied, a substantially oval rim on the hub, and at least one end of the hub wall being flared outwardly from said shoulder to the rim in the direction of the major axis of the rim.

6. In hub and spigot pipe, a hub having a base providing a reduced circular throat, an internal annular shoulder tapering upwardly and outwardly surrounding said throat and constituting a substantially conical seat for the spigot end of an adjacent pipe section when applied, a substantially oval rim on the hub with its major and minor axes intersecting at a point concentric with said throat, and the ends of the hub walls opposed in the direction of the major axis of the rim being outwardly and oppositely flared from said shoulder to the rim.

7. In hub and spigot pipe, a hub having a base providing a reduced circular throat, an internal annular shoulder tapering upwardly surrounding said throat and constituting a substantially conical seat for the spigot end of an adjacent pipe section when applied, a substantially oval rim on the hub and having a semi-circular portion, the major and minor axes of the rim intersecting at a point eccentric with said throat axis, that end of the hub wall extending from said semi-circular rim portion on the shoulder being semi-cylindrical, and the remainder of the hub wall from the remainder of the rim to the shoulder being flared outwardly in the direction of the major axis of the rim.

8. A pipe fitting having a spigot end portion and a hub end portion, the base of the hub providing a circular throat on the radius of the pipe bore, an internal annular shoulder tapering upwardly and outwardly surrounding the throat at the base of the hub and constituting a substantially conical seat for the spigot end of an adjacent pipe section when applied, the rim of the hub being substantially oval with major and minor axes intersecting at a point concentric with said throat and with its major axis in the longitudinal median plane of the fitting, and at least one end of the hub wall being flared outwardly from said shoulder to the rim in a direction of the major axis of the rim.

9. An angle pipe fitting having a hub at one end and a spigot end portion with its longitudinal portion at an angle relative to the hub axis, the base of said hub providing a circular throat on the radius of the spigot end portion, an internal annular shoulder tapering upwardly and outwardly surrounding said throat and constituting a substantially conical seat with the spigot end of an adjacent pipe section when applied, the rim of the hub being substantially oval with its major and minor axes intersecting at a point concentric with the throat and with its major axis lying in a longitudinal median plane of the fitting, and the ends of the hub wall opposed in the direction of the major axis of the rim being outwardly and oppositely flared from said shoulder to the rim.

10. A branch pipe fitting having a hub at one end, a spigot at the other end, and a branch connection extending laterally therefrom intermediate the hub and spigot, the base of said hub providing a circular throat on the radius of the fitting bore, an internal annular shoulder tapering upwardly and outwardly surrounding the throat and constituting a substantially conical seat for the spigot end of the adjacent pipe section when applied, the hub having a substantially oval rim with its major and minor axes intersecting at a point eccentric with the throat axis and with its major axis lying in the longitudinal median plane of the fitting, said rim having at one end a semi-circular portion on the side of its minor axis opposite the said branch connection, the opposite end of said rim extending over said branch connection, the hub wall from said semi-circular rim portion to the shoulder being semi-cylindrical, and the remainder of the hub wall from the remainder of the rim to the shoulder being flared outwardly in the direction of said branch connection.

11. A branch pipe fitting having a hub at one end, a spigot at the other end, and a branch connection extending laterally therefrom intermediate of hub and spigot, the base of said laterally extending hub providing a circular throat, an internal annular shoulder tapering upwardly and outwardly surrounding the throat and constituting a substantially conical seat for the spigot end of the adjacent pipe section when applied, the rim of the said laterally extending hub being substantially oval with its major and minor axes intersecting at a point concentric with the throat, and the ends of the hub wall opposed in the direction of the major axis of the rim being outwardly and oppositely flared from said shoulder to the rim.

12. In hub and spigot pipe, a hub having a base providing a reduced circular throat, an internal annular shoulder of reverse curvature surrounding said throat and constituting a seat for the spigot end of an adjacent pipe section when applied, a substantially oval rim on the hub having a semi-circular portion, the major and minor axes of the rim intersecting at a point eccentric with the throat axis, that portion of the hub wall extending from the semi-circular rim portion to the shoulder being semi-cylindrical, and the remainder of the hub wall from the remainder of the rim to the shoulder being flared outwardly in the direction of the major axis of the rim.

13. In a branch pipe fitting having a hub at one end, a spigot at the other end, and a branch connection extending laterally therefrom intermediate the hub and spigot, the base of said hub providing a circular throat on the radius of the fitting bore, an internal annular shoulder of reverse curvature surrounding the throat and constituting a seat for the spigot end of an adjacent pipe section when applied, the hub having a substantially oval rim with its major and minor axes intersecting at a point eccentric with the throat axis and with its major axis lying in the longitudinal median plane of the fitting, said rim having at one end a semi-circular portion on the side of its minor axis opposite said branch connection, the opposite end of said rim extending over said branch connection, the hub wall from said semi-circular rim portion to the shoulder being semi-cylindrical, and the remainder of the hub wall from the remainder of the rim to the shoulder being flared outwardly in the direction of the said branch connection.

References Cited in the file of this patent
UNITED STATES PATENTS

| | | |
|---|---|---|
| 481,935 | Dunham | Sept. 6, 1892 |
| 1,225,777 | Craig | May 15, 1917 |
| 2,065,524 | Groeniger | Dec. 29, 1936 |